United States Patent [19]

Kern et al.

[11] 4,181,685

[45] * Jan. 1, 1980

[54] THERMOPLASTIC MOLDING COMPOSITIONS ON THE BASIS OF POLYOXYMETHYLENES

[75] Inventors: Rudolf Kern, Mainz; Heinz Schmidt, Frankfurt am Main; Karlheinz Burg, Naurod; Ernst Wolters, Frankfurt am Main; Gunter Sextro, Naurod, all of Fed. Rep. of Germany

[73] Assignee: Hoechst Aktiengesellschaft, Frankfurt am Main, Fed. Rep. of Germany

[ * ] Notice: The portion of the term of this patent subsequent to Feb. 8, 1994, has been disclaimed.

[21] Appl. No.: 676,927

[22] Filed: Apr. 14, 1976

Related U.S. Application Data

[63] Continuation-in-part of Ser. No. 217,667, Jan. 13, 1972, abandoned, and Ser. No. 217,668, Jan. 13, 1972, Pat. No. 4,070,415.

[30] Foreign Application Priority Data

Jan. 15, 1971 [DE] Fed. Rep. of Germany ....... 2101817
Oct. 7, 1971 [DE] Fed. Rep. of Germany ....... 2150038

[51] Int. Cl.² ............................................ C08L 59/02
[52] U.S. Cl. .................................................. 525/402
[58] Field of Search ........................... 260/823, 830 R

[56] References Cited

U.S. PATENT DOCUMENTS

| 3,519,696 | 7/1970 | Cherdron et al. | 260/823 |
| 4,070,415 | 1/1978 | Sextro et al. | 260/823 |

*Primary Examiner*—Wilbert J. Briggs, Sr.
*Attorney, Agent, or Firm*—Curtis, Morris & Safford

[57] ABSTRACT

Thermoplastic molding compositions having improved properties are composed of a mixture of from 99.999 to 90% by weight of a linear polyoxymethylene and from 0.001 to 10% by weight of a branched or cross-linked polyoxymethylene. The linear polyoxymethylenes are homopolymers of formaldehyde or of trioxane or copolymers of trioxane and at least one compound of monofunctional reaction which can be copolymerized with trioxane. The branched or cross-linked polyoxymethylenes are copolymers of trioxane and a multifunctionally reacting compound, or copolymers of trioxane, a monofunctionally reacting compound and a branched or cross-linked polyether. The molding compositions yield shaped articles having improved mechanical properties.

17 Claims, No Drawings

THERMOPLASTIC MOLDING COMPOSITIONS ON THE BASIS OF POLYOXYMETHYLENES

This application is a continuation-in-part application of copending applications Ser. No. 217,667 now abandoned and Ser. No. 217,668 now U.S. Pat. No. 4070415 both filed on Jan. 13, 1972.

The present invention relates to thermoplastic molding compositions on the basis of polyoxymethylenes (POM).

It is known that polyacetals (polyoxymethylenes POM) have a strong tendency to crystallize. Even if the melt is undercooled to a small extent only, a rapid growth of spherulites is observed which, in most cases, are much larger than the length of light waves and confer upon the material a considerable opacity. Moreover, owing to the crystallization process a great number of microscopically small fissures and internal tensions are formed in the interior and on the surface of the material. These fissures and internal tensions detrimentally affect the mechanical properties of shaped articles, for example injection molded articles, made from polyoxymethylenes. The aforesaid flaws are the more pronounced the larger the individual spherulites.

It is also known that by adding 0.0001 to 0.5% by weight of talc to polyoxymethylenes of high molecular weight and uniformly distributing the said inorganic additive in the organic polymer, the crystal structure of injection molded articles can be rendered more uniform and hence a structure of coarse spherulites having an average diameter of 100 microns can be transformed into a homogeneous structure in which the spherulites have a diameter of 4 to 8 microns (cf. British Pat. No. 1.133.490). The aforesaid data relate to injection molded articles which have been crystallized under pressure at a temperature in the range of from 50° to 100° C.

Furthermore it is known that the size of the spherulites of polyoxymethylenes may be reduced by mixing the polyoxymethylenes, before melting them, with certain organic nucleating agents which, in the polyoxymethylene melt, are insoluble or soluble to a small extent only. For example hydroxy groups containing imidazole or pyrazine derivatives (of. British Patent No. 1 192.708).

It is also known that the crystalline structure of thermoplastic, crystallizable high polymers, for example oxymethylene polymers, can be modified during cooling of the polymer melt with the aid of nucleating agents which are chemically stable at a temperature above the crystallite melting point of the polymer (cf. U.S. Pat. No. 3,367,926). Besides a great number of the most different chemical compounds polyoxymethylene is also mentioned as nucleating agent but nothing is said about whether polyoxymethylenes are suitable nucleating agents for other polyoxymethylenes. Attempts to nucleate known linear homo- or copolymers of formaldehyde or trioxane by adding an identical or a different linear homo- or copolymer of formaldehyde or trioxane did not give, however, any nucleating effect.

The first subject of the present invention is a thermoplastic molding composition consisting essentially of a mixture of
(A) from 99.9 to 90, preferably from 99.9 to 95 and especially from 99.9 to 98% by weight of a linear polyoxymethylene being
  (a) a homopolymer of formaldehyde or of trioxane, the terminal hydroxyl groups of which homopolymer being stabilized against degradation by chemical reaction, or
  (b) a copolymer of trioxane and a monofunctionally reacting compound copolymerizable with trioxane, which copolymer has been subjected to a controlled, partial, thermal or hydrolytic degradation down to primary terminal alcohol groups, and
(B) as a nucleating agent for (A) from 0.1 to 10, preferably from 0.1 to 5 and especially from 0.1 to 2% by weight of a branched or cross-linked polyoxymethylene being
  (a) a copolymer of trioxane and a multifunctionally reacting compound copolymerizable with trioxane, or
  (b) a copolymer of trioxane, a multifunctionally reacting compound copolymerizable with trioxane and a monofunctionally reacting compound copolymerizable with trioxane, and being prepared by mixing the components and subsequently homogenizing them in the melt.

The second subject of the present invention is a thermoplastic molding composition consisting essentially of a mixture of
(A) a linear polyoxymethylene being
  (a) a homopolymer of formaldehyde or of trioxane, the terminal hydroxyl groups of which homopolymer being stabilized against degradation by chemical reaction, or
  (b) a copolymer of trioxane and a monofunctionally reacting compound copolymerizable with trioxane, which copolymer has been subjected to a controlled, partial, thermal or hydrolytic degradation down to primary terminal alcohol groups, and
(B) as a nucleating agent for (A) a branched or cross-linked polyoxymethylene being
  (a) a copolymer of trioxane with a multifunctionally reacting compound copolymerizable with trioxane, compound (A) amounting to from 99.999 to 99.9, preferably from 99.99 to 99.9% by weight and component (B) amounting to from 0.001 to 0.1, preferably from 0.01 to 0.1% by weight, or
  (b) a copolymer of trioxane, a multifunctionally reacting compound copolymerizable with trioxane and a monofunctionally reacting compound copolymerizable with trioxane, compound (A) amounting to from 99.999 to 99.9, preferably from 99.99 to 99.9% by weight and component (B) amounting to from 0.001 to 0.1, preferably from 0.01 to 0.1% by weight, or
  (c) a copolymer of trioxane, a monofunctionally reacting compound copolymerizable with trioxane and a branched or crosslinked polyether, component (A) amounting to from 99.999 to 90, preferably from 99.9 to 95 and especially from 99.5 to 97% by weight and component (B) amounting to from 0.001 to 10, preferably from 0.1 to 5 and especially from 0.5 to 3% by weight, and being prepared by mixing the components and subsequently homogenizing them in the melt.

Branched or cross-linked polyoxymethylenes having a low melt index generally are used in smaller amounts in order to attain a satisfactory nucleation than polyoxymethylenes having a higher melt index.

By homopolymers of formaldehyde or trioxane there are to be understood those homopolymers of formaldehyde or trioxane the terminal hydroxyl groups of which have been stabilized against degradation by chemical reaction, for example esterification or etherification.

When linear trioxan copolymers are used, suitable comonomers for trioxane are cyclic ethers having from 3 to 5, preferably 3 ring members, or cyclic acetals differing from trioxane and having from 5 to 11, preferably 5 to 8 ring members, or linear polyacetals, each in amounts of from 0.1 to 20, preferably 0.5 to 10% by weight. Most suitable are copolymers containing from 99 to 95% by weight of trioxane, and from 1 to 5% by weight of one of the above-mentioned components.

Suitable cyclic ethers or cyclic acetals are compounds of the formula (I)

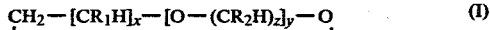

$$CH_2-[CR_1H]_x-[O-(CR_2H)_z]_y-O \qquad (I)$$

where $R_1$ and $R_2$ may be the same or different, each representing a hydrogen atom, an aliphatic alkyl radical having from 1 to 6, preferably from 1 to 3 carbon atoms, which radical may contain from 1 to 3 halogen atoms, preferably chlorine atoms, or a phenyl radical, x is either an integer of from 1 to 3 and y is zero, or x is zero, y an integer of from 1 to 3 and z is 2, or x is zero, y is 1 and z is an integer of from 3 to 6, preferably 3 or 4, or where $R_1$ is an alkoxymethyl radical having from 2 to 6, preferably from 2 to 4 carbon atoms, or a phenoxymethyl radical, x being 1, y being zero and $R_2$ being as defined above.

Especially suitable as cyclic ethers or cyclic acetals are compounds of the formula (II)

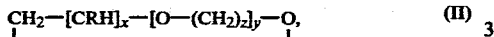

$$CH_2-[CRH]_x-[O-(CH_2)_z]_y-O, \qquad (II)$$

where R is a hydrogen atom, an aliphatic alkyl radical having from 1 to 6, preferably from 1 to 3 carbon atoms, which radical may contain from 1 to 3 halogen atoms, preferably chlorine atoms, or a phenyl radical, x is either an integer of from 1 to 3 and y is zero, or x is zero, y an integer of from 1 to 3 and z is 2, or x is zero, y is 1 and z an integer of from 3 to 6, preferably 3 or 4, or where R is an alkoxymethyl radical having from 2 to 6, preferably from 2 to 4 carbon atoms, or a phenoxymethyl radical, x being 1 and y zero.

Preferably, there are used as cyclic ethers or cyclic acetals compounds of the formula (III)

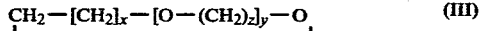

$$CH_2-[CH_2]_x-[O-(CH_2)_z]_y-O \qquad (III)$$

where x either is an integer of from 1 to 3 and y is zero, or where x is zero, y an integer of from 1 to 3 and z is 2, or where x is zero, y is 1 and z an integer of from 3 to 6, preferably 3 or 4.

Suitable cyclic ethers are above all those having 3 ring members, for example ethylene oxide, styrene oxide, propylene oxide, or epichlorohydrin or phenylglycidyl ether.

Suitable cyclic acetals are above all cyclic formals of aliphatic or cyclo-aliphatic α,ω-diols having from 2 to 8, preferably from 2 to 4 carbon atoms, the carbon chain of which may be interrupted by an oxygen atom at intervals of 2 carbon atoms, for example glycol formal (1,3-dioxolane), butanediol formal (1,3-dioxepane) or diglycol formal (1,3,6-trioxocane), furthermore 4-chloromethyl-1,3-dioxolane or hexanediol formal (1,3-dioxonane).

As linear polyacetals there may be used homo- or copolymers of the cyclic acetals as defined above, as well as linear condensates of aliphatic or cycloaliphatic α,ω-diols with aliphatic aldehydes or thioaldehydes, preferably formaldehyde. Especially suitable are homopolymers of linear formals of aliphatic α,ω-diols having from 2 to 8, preferably from 2 to 4 carbon atoms, for example polydioxolane, poly-(1,3-propanediol formal) or poly-(1,4-butanediol formal).

The reduced specific viscosity values (RSV values) of the linear polyoxymethylenes used in accordance with the invention (measured at 140° C. in butyrolactone containing 2% by weight of diphenylamine, in a concentration of 0.5 g/100 ml) are from 0.07 to 2.50 dl.g$^{-1}$, preferably from 0.14 to 1.20 dl.g$^{-1}$. The crystallite melting points of the polyoxymethylenes are in the range of from 140° to 180° C., the densities thereof in the range of from 1.38 to 1.45 g.ml$^{-1}$ (measured according to DIN 53 479).

The linear, preferably binary or ternary trioxane copolymers used in accordance with the invention are prepared in known manner by polymerization of the monomers in the presence of catalysts having a cationic action at temperatures of from 0° to 100° C., preferably from 50° to 90° C. (cf. British Patent No. 903.668). As catalysts, there are used for example Lewis acids, such as boron trifluoride or antimony pentafluoride, or complex compounds of Lewis acids, preferably etherates, for example boron trifluoride-diethyl-etherate or boron trifluoride-ditert.-butyl-etherate. Furthermore, there are used protonic acids, for example perchloric acid, or salt-like compounds, for example triphenylmethyl-hexafluoro-phosphate, triethyl-oxonium-tetrafluoro-borate or acetyl-perchlorate. The polymerization may be carried out in the mass, in suspension or in solution. In order to remove unstable groups the copolymers are advantageously subjected to a controlled, partial, thermal or hydrolytic degradation down to primary terminal alcohol groups (cf. British Pat. Nos. 926.903, 951,272 and 986,925).

The homopolymers of formaldehyde or trioxane used in accordance with the invention are also prepared in known manner by catalytic polymerization of the monomer (cf. for example U.S. Pat. No. 2.768.994 and British Pat. No. 877.820).

When the branched or cross-linked polyoxymethylenes used in accordance with the invention are prepared by copolymerization of trioxane with at least one compound of multifunctional reaction which can be copolymerized with trioxan or, optionally, with at least one compound of monofunctional reaction with trioxane, the multifunctional compounds generally are used in amounts of from 0.01 to 5, preferably from 0.05 to 2% by weight, and the monofunctional compounds generally in amounts of from 0.1 to 10, preferably from 1 to 5% by weight.

As compounds of monofunctional reaction there are employed the cyclic ethers, cyclic acetals or linear polyacetals mentioned in connection with the preparation of the linear trioxane copolymers used in accordance with the invention.

As compounds of multifunctional reaction, those monomer or oligomer compounds are employed which contain at least one of the cited monofunctional cyclic ether or cyclic acetal groups, and none, one or several linear acetal groups; the total number of the cited reactive cyclic ether, cyclic acetal and linear acetal groups being at least 2. Preferably, alkylglycidyl formals, polyglycol-diglycidyl ethers, alkanediol-diglycidyl ethers or bis(alkanetriol)-triformals are used.

By alkylglycidyl formals there are to be understood compounds of the formula (IV)

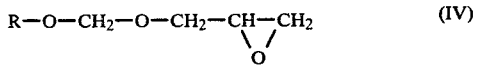

where R is an aliphatic alkyl radical having from 1 to 10, preferably from 1 to 5 carbon atoms. Very advantageous are alkylglycidyl formals of the above formula, where R is a linear lower aliphatic alkyl radical, for example methyl-, ethyl-, propyl- or butyl-glycidyl formal.

Polyglycol-diglycidyl ethers are compounds of the formula (V)

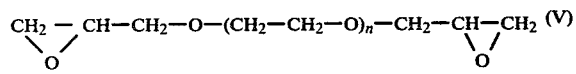

where n is an integer of from 2 to 5. Especially suitable are poly-diglycidyl ethers of the above formula, where n is 2 or 3, for example diethyleneglycol or triethyleneglycol-diglycidyl ether.

Alkanediol-diglycidyl ethers are compounds of the formula (VI)

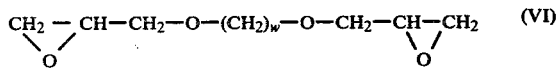

where w is an integer of from 2 to 6, preferably from 2 to 4. Butane diol-diglycidyl ether is especially suitable.

By bis(alkanetriol)-triformals, there are to be understood compounds having one linear and two cyclic formal groups, especially compounds of the formula (VII)

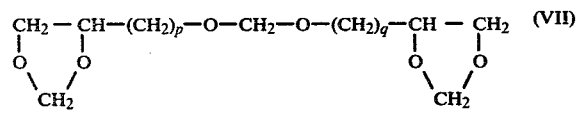

where p and q each are integers of from 3 to 9, preferably 3 or 4. Especially suitable are symmetric bis(alkanetriol)-triformals of the cited formula, where p and q represent the same number, for example bis(1,2,5-pentanetriol)-triformal or, preferably, bis(1,2,6-hexanetriol)-triformal.

As compounds of multifunctional reaction for the preparation of the branched or cross-linked polyoxymethylenes used in accordance with the invention, also those oligomer formals may be employed which are obtained by reaction of 1 mol of a 1,2(5-11)-triol with 0 to 1 mol of an α,ω-diol having a molecular weight of from 62 to 1000, 0 to 1 mol of a monohydric alcohol having from 1 to 11 carbon atoms and 1 mol of formaldehyde per 2 mols each of OH groups of the reaction mixture (cf. British Pat. No. 1.171.107).

The copolymerization of trioxane with the cited multifunctional and monofunctional compounds is carried out in the same manner as indicated for the preparation of the linear trioxan copolymers. The degradation of unstable terminal chain groups may be carried out in principle according to the methods known for the stabilization of terminal groups of trioxan copolymers It is, however, also possible to employ the branched or cross-linked polyoxymethylenes directly as nucleating agent in a finely ground form, without further work-up.

A further method for the preparation of these branched or cross-linked polyoxymethylenes comprises reacting linear polyoxymethylenes with the above-mentioned multifunctional compounds in the presence of cationic catalysts, and, preferably, using inert diluents, for example cyclohexane, n-hexane or methylene chloride.

The branched or cross-linked polyoxymethylenes used in accordance with the first subject of the invention have melt indices $i_2$ of from 0.1 to 50 g/10 min., preferably from 0.5 to 20 g/10 min. Especially suitable are products having melt indices of from 1 to 2 g/10 min. The melt index $i_2$ is measured according to DIN 53 735 at a temperature of 190° C. and a load of 2.16 kg.

The polyether containing branched or cross-linked polyoxymethylene used in accordance with the invention are prepared by polymerisation of trioxane with branched or cross-linked polyethers, optionally in the presence of at least one compound known for the copolymerization of trioxane. In this case, mixtures of from 99.99 to 50, preferably from 99.8 to 70% by weight of trioxane, from 0 to 20, preferably from 0.1 to 10% by weight of at least one compound known for the copolymerization with trioxane and from 0.01 to 30, preferably from 0.1 to 20% by weight of a branched or cross-linked polyether are used for the polymerization. Best results are obtained when from 98.5 to 85% by weight of trioxan, from 1 to 5% by weight of at least one compound known for the copolymerization with trioxan, and from 0.5 to 10% by weight of a branched or cross-linked polyether are employed.

As branched or cross-linked polyethers there are used copolymers of at least one, preferably two, monofunctionally reacting cyclic ethers having from 3 to 5 ring members, and a bifunctionally reacting cyclic ether, i.e. an aliphatic or cycloaliphatic compound containing two ring ether groups and from 3 to 5, preferably 3 or 4, ring members.

As monofunctionally reacting cyclic ethers there are used preferably compounds of the formula (VIII)

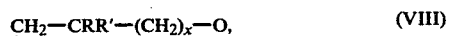

where R and R' are the same or different, each representing a hydrogen atom, an aliphatic alkyl radical having from 1 to 6, preferably from 1 to 3, carbon atoms, which radical may contain from 1 to 3 halogen atoms, preferably chlorine atoms, or a phenyl radical, and x is zero or 1 or 2. Examples are ethylene oxide, propylene oxide, isobutylene oxide, epichlorohydrin, oxacyclobutane, 3,3-bis(chloromethyl)-oxacyclo-butane, or tetrahydrofuran.

Suitable bifunctionally reacting cyclic ethers are especially diglycidyl ethers of α,ω-diols having from 2 to 8, preferably from 2 to 4 carbon atoms, the carbon chain of which may be interrupted by an oxygen atom at intervals of 2 carbon atoms, or diglycidyl ethers of bisphenols, or aliphatic or cycloaliphatic hydrocarbons doubly substituted by an oxacyclobutyl radical and having from 1 to 6 carbon atoms. Examples are: 1,3- propanediol- or 1,4-butanediol-diglycidyl ether, glycol-, diglycol- or triglycol-diglycidyl ether, 4,4'-bis-glycidoxyphenyl-dimethylmethane, 1,2-bis(3-oxacyclobutyl)-ethane, 1,4-bis(3-oxacyclobutyl)-butane or 2,9-dioxa-dispiro[3.2.3.2.]duodecane.

The amount of monofunctionally reacting cyclic ethers generally is from 99.99 to 98, preferably from 99.95 to 99% by weight, while the amount of the bifunctionally reacting cyclic ether is from 0.01 to 2, preferably from 0.05 to 1% by weight.

The branched or cross-linked polyethers generally are prepared according to known methods by copolymerization of the monomers using cationic or anionic initiators. The polyethers may also be obtained by additional grafting or condensation of linear polyethers.

The copolymerization of trioxane with the branched or crosslinked polyethers as described and, optionally, with at least one compound known for the copolymerization of trioxan is carried out in the manner already indicated for the preparation of linear trioxan copolymers.

It is furthermore possible to incorporate branched or crosslinked polyethers into linear polyoxymethylenes by mixing polyethers and polyoxymethylenes, preferably in the presence of a solvent for polyethers, for example cyclohexane or methylene chloride, and by reacting them at temperatures of from 0° to 100° C., preferably from 50° to 90° C., using cationic catalysts. Unstable amounts are removed or terminal hydroxyl groups are stabilized in an analogous manner as described above.

The branched or cross-linked polyoxymethylenes used in accordance with the second subject of the invention have melt indices $i_2$ of from 0 to 50 g/10 min., preferably from 0 to 10 g/10 min. according to DIN 53 735 at a temperature of 190° C. and a load of 2.16 kg. By indicating an inferior limit value of zero for $i_2$ it is to be understood that above a determined cross-linking degree the polyoxymethylenes used in accordance with the invention cannot be molten or dissolved, that therefore their characterization via melt indices or RSV values is impossible. Especially suitable are branched or cross-linked polyoxymethylenes having melt indices $i_2$ of from 0.1 to 5 g/10 min.

Both the components of the molding compositions of the invention may be mixed with stabilizers against the action of heat, oxygen and light and subsequently be homogenized in the melt. Suitable heat stabilizers are, for example, polyamides, amides of polybasic carboxylic acids, amidines, hydrazines, ureas and poly(N-vinyl-lactams). As oxidation stabilizers phenols, especially bisphenols, and aromatic amines are used and suitable stabilizers against the action of light are derivatives of α-hydroxy-benzophenone and of benzotriazone, the stabilizers being used in an amount of from 0.1 to 10% by weight, preferably 0.5 to 5% by weight, calculated on the total mixture.

For the preparation of the molding compositions of the invention, the components are mixed in the form of powder or granules and subsequently homogenized in the melt. Branched or cross-linked polyoxymethylenes having melt index values below 0.1 g/10 min. are advantageously used in the form of dust-like powders (size of grain < 1 micron).

Mixing and homogenizing of the components of the invention may be carried out in any heatable mixing equipment, for example rollers, calenders, kneaders or extruders. The mixing temperatures are advantageously above the crystallite melting point of the components, and they are in the range of from 150° C. to 250° C., preferably from 170° to 200° C.

Obviously, by the presence of branched or cross-linked polyoxymethylenes, the molding compositions of the invention are nucleated during the manufacture of shaped articles, which results in a reduced size of the spherulites and in improved properties of the shaped articles. They have, for example, increased ball indentation hardness, tensile stress at yield and at break, and stiffness in torsion as compared with an unmodified linear polyoxymethylene. A further result of the nucleation is an increased crystallization rate which makes possible an increased speed of processing, proved by shorter injection molding cycle times and narrower tolerances of injection molded articles.

A further advantage of using branched or cross-linked polyoxymethylenes as nucleating agent for linear polyoxymethylenes according to the present invention resides in the fact that the branched or cross-linked polyoxymethylenes can be synthesized as products of uniform quality which do not require special purification, as this is necessary for example when using natural minerals suitable as nucleating agents.

Quite generally, a nucleation of linear polyoxymethylenes by adding small amounts of branched or cross-linked polyoxymethylenes is possible. Thus, the examples for the preparation of branched or cross-linked polyoxymethylenes is given herein are not exhaustive, and they only illustrate some possible methods without limiting the application of branched or cross-linked polyoxymethylenes in accordance with the invention.

The molding compositions of the invention can be comminuted mechanically, for example by chopping or grinding, into granules, chips, flakes or powders, and processed in the thermoplastic state, for example by injection molding or extrusion. They may be used for the manufacture of shaped articles which are employed as semi-finished or finished goods, for example bars, rods, plates, films, sheets, ribbons, bowls or tubes; and they are especially suitable for the manufacture of machine parts requiring dimensional accuracy, for example gear wheels, bearing parts or elements for control units.

The following Examples illustrate the invention; parts and percentages being by weight unless otherwise stated.

EXAMPLES 1 to 6

A linear copolymer of 98% of trioxane and 2% of ethylene oxide having a density of 1.41 g.ml$^{-1}$, a RSV value of 0.73 dl.g$^{-1}$ and a crystallite melting point of 166° C. is mixed, in the form of a powder, with 0.5% of bis(2-hydroxy-3-tert.-butyl-5-methylpheyl)methane and 0.1% of dicyano-diamide, relative to the amount of the linear polyoxymethylene, and with varying amounts, relative to the mixture in each case, of a cross-linked terpolymer of 98% of trioxan, 1.8% of ethylene oxide and 0.2% of 1.4-butanediol-diglycidyl ether having a melting index $i_2$ of 0.2 g/10 min., which previously has been stabilized in the same manner, and which is in the form of granules; and the mixture is homogenized at 200° C. in a single screw extruder. The residence time in the cylinder of the extruder is about 4 minutes. After leaving the extruder, the polyoxymethylene mixture obtained in each case is granulated.

To determine the size of the spherulites in the products obtained films having a thickness of about 10 microns are prepared from the granules or shaped articles by melting them at 180° C. between two glass plates with subsequent crystallization at 150° C. under atmospheric pressure, which films are examined under the microscope.

Furthermore, sheets of dimensions 60×60×2 millimeters are made from the granules by injection molding at a temperature of the composition of 200° C. and a temperature of the mold of 80° C., which sheets are used for the ball indentation hardness test according to VDE 0302 (load time 10 seconds).

The tensile stress at yield and at break is measured using molded traction rods (¼ proportional rods) having a thickness of 1 mm according to DIN 53 455.

The stiffness in torsion is determined according to DIN 53 447 at a temperature of 20° C. and a load time of 60 seconds, using test rods made from plates having a thickness of 2 mm.

The sizes of the spherulites and the mechanical properties of shaped articles made from molding compositions of the invention are listed in Table 1. For a comparison, the corresponding data of linear polyoxymethylene which has not been nucleated are given.

Table 1

| Example | Terpolymer (% by weight) | Size of spherulites (microns) | Ball indentation hardness (kp/cm$^2$) | Tensile stress at yield (kp/cm$^2$) | Tensile stress at break (kp/cm$^2$) | Stiffness in Torsion (kp/cm$^2$) |
|---|---|---|---|---|---|---|
| a | — | 350 | 1560 | 650 | 506 | 7600 |
| 1 | 0.08 | 32 | 1600 | 690 | 560 | 8180 |
| 2 | 0.06 | 38 | 1590 | 685 | 560 | 8160 |
| 3 | 0.04 | 40 | 1590 | 680 | 550 | 8000 |
| 4 | 0.02 | 45 | 1580 | 680 | 545 | 8030 |
| 5 | 0.01 | 55 | 1580 | 670 | 540 | 7950 |
| 6 | 0.005 | 65 | 1575 | 670 | 530 | 7950 |

EXAMPLES 7 to 11

A linear copolymer of 97% of trioxane and 3% of dioxolane having a density of 1.41 g.ml$^{-1}$, a RSV value of 0.72 dl.g$^{-1}$ and a crystallite melting point of 166° C. is mixed and homogenized, in the form of a powder, with the stabilizers cited in Examples 1 to 6 in the same amounts as indicated there, and with 0.5% by weight each of the pulverulent terpolymers of trioxan, 2% of ethylene oxide and varying amounts of 1,4-butanediol-diglycidyl ether as indicated in Table 2. The melt indices i$_2$ of the terpolymers used and the size of spherulites of shaped articles manufactured from mixtures of linear and cross-linked polyoxymethylene are listed in Table 2.

Table 2

| | Terpolymer made from | | | | |
|---|---|---|---|---|---|
| Example | trioxane (% by weight) | ethylene oxide (% by weight) | butane-diol diglycidyl ether (% by weight) | Melt Index (g/10 min) | Size of Spherulites (microns) |
| b | — | — | — | — | 530 |
| 7 | 97.8 | 2 | 0.2 | 0.06 | 17 |
| 8 | 97.4 | 2 | 0.6 | 0.01 | 13 |
| 9 | 97.0 | 2 | 1.0 | 0 | 15 |
| 10 | 96.0 | 2 | 2.0 | 0 | 11 |
| 11 | 95.0 | 2 | 3.0 | 0 | 9 |

EXAMPLES 12 to 18

A pulverulent linear copolymer of 98% of trioxane and 2% of ethylene oxide having a density of 1.41 g.ml$^{-1}$, a RSV value of 0.73 dl.g$^{-1}$ and a crystallite melting point of 166° C. is mixed with 0.5% of bis(2-hydroxy-3-tert.-butyl-5-methyl-phenyl)methane and 0.1% of dicyanodiamide, relative to the amount of the linear polyoxymethylene, and with varying amounts of a granulated cross-linked terpolymer of 98% of trioxane 1.95% of ethylene oxide and 0.05% of 1.4-butanediol-diglycidyl ether having a melt index i$_2$ of 1.0 g/10 min., which previously has been stabilized in the same manner, and the mixture is homogenized at 200° C. in a single screw extruder. The residence time in the cylinder of the extruder is about 4 minutes.

The sizes of the spherulites and the mechanical properties of shaped articles made from molding compositions of the invention are listed in Table 3. For a comparison, the corresponding data of linear polyoxymethylene which has not been nucleated are given.

Table 3

| Example | Terpolymer (%) | Size of spherulites (microns) | Ball indentation hardness (kp/cm$^2$) | Tensile stress at yield (kp/cm$^2$) | Tensile stress at break (kp/cm$^2$) | Stiffness in Torsion (kp/cm$^2$) |
|---|---|---|---|---|---|---|
| c | — | 230 | 1570 | 652 | 516 | 7600 |
| 12 | 0.5 | 16 | 1585 | 706 | 564 | 8180 |
| 13 | 1.0 | 14 | 1590 | 716 | 562 | 8160 |
| 14 | 2.0 | 13 | 1600 | 720 | 566 | 8140 |
| 15 | 3.0 | 12 | 1610 | 726 | 567 | 8260 |
| 16 | 4.0 | 11 | 1625 | 726 | 552 | 8300 |
| 17 | 5.0 | 9 | 1615 | 729 | 575 | 8430 |
| 18 | 8.0 | 9 | 1610 | 728 | 560 | 8450 |

EXAMPLES 19 to 23

A pulverulent linear copolymer of 96% of trioxane and 4% of dioxolane having a density of 1.40 g.ml$^{-1}$, a RSV value of 0.68 dl.g$^{-1}$ and a crystallite melting point of 164° C. is mixed and homogenized with the stabilizers indicated in Examples 12 to 18 and with 1% each of the pulverulent terpolymers listed in Table 4. The terpolymers are composed of trioxane, 2% of ethylene oxide and varying amounts of 1,4-butanediol-diglycidyl ether. The size of the spherulites of the products obtained is measured.

Table 4

| | Terpolymer made from | | | |
|---|---|---|---|---|
| Example | trioxane (% by weight) | ethylene oxide (% by weight) | butanediol diglycidyl ether (% by weight) | Size of spherulites (microns) |
| d | — | — | — | 592 |
| 19 | 97.9 | 2 | 0.1 | 8 |
| 20 | 97.5 | 2 | 0.5 | 14 |
| 21 | 97.0 | 2 | 1.0 | 15 |
| 22 | 96.0 | 2 | 2.0 | 21 |

Table 4-continued

| | Terpolymer made from | | | |
|---|---|---|---|---|
| Example | trioxane (% by weight) | ethylene oxide (% by weight) | butanediol diglycidyl ether (% by weight) | Size of spherulites (microns) |
| 23 | 93.0 | 2 | 5.0 | 17 |

EXAMPLES 24 to 28

A pulverulent linear copolymer of 98% of trioxane and 2% of ethylene oxide having a density of 1.41 g.ml$^{-1}$, a RSV value of 0.71 dl.g$^{-1}$ and a crystallite melting point of 166° C. is mixed and homogenized according to Examples 1 to 6 with the stabilizers and in amounts thereof as indicated in these Examples, and with 1% each of the terpolymers of trioxan, ethylene oxide (EO) or dioxolane (DO) and a multifunctionally reacting compound listed in Table 5. As multifunctionally reacting compounds, dicyclopentadiene oxide (I), methylglycidyl formal (II), the formal of 1,2,6-hexanetriol and polyglycol of molecular weight 1000 (III), 1,2,6-hexanetriol formal (IV) and the formal of 1,2,6-hexanetriol and 1,6-hexanediol (V) are employed. The melt indices i$_2$ of the cross-linked terpolymers and the sizes of the spherulites of shaped articles obtained from the molding compositions of the invention, furthermore the ball indentation hardness and the tensile stress at yield are indicated in Table 5.

Table 5

| | Terpolymer made from | | | | | Ball indentation hardness Tensile stress at yield (kp/cm$^2$) |
|---|---|---|---|---|---|---|
| Example | trioxane (% by weight) | EO or DO (% by weight) | multifunctional compound (% by weight) | melt index | Size of spherulites (microns) | |
| e | — | — | — | — | 387 | 1545 620 |
| 24 | 97.9 | 2 AO | 0.1 I | 0 | 9 | 1675 660 |
| 25 | 97.9 | 2 AO | 0.1 II | 0.08 | 21 | 1585 640 |
| 26 | 95.0 | 2 DO | 3.0 III | 0.05 | 19 | 1615 645 |
| 27 | 97.9 | 2 DO | 0.1 IV | 0 | 16 | 1615 645 |
| 28 | 97.0 | 2 DO | 1.0 V | 0 | 8 | 1660 660 |

EXAMPLES 29 to 38

A linear copolymer of 98% of trioxane and 2% of ethylene oxide having a density of 1.41 g.ml$^{-1}$; a crystallite melting point of 166° C. and a RSV value of 0.73 dl.g$^{-1}$ is mixed with the stabilizers indicated in Examples 1 to 6 in the amounts also indicated there, and with varying amounts of the finely ground cross-linked polyoxymethylenes (POM I to VIII) as hereinafter described, and extruded in a single screw extruder, at a temperature of the cylinder of 190° C., a temperature at the top of 180° C., and at a screw rotation of 60 r.p.m., and subsequently granulated. The residence time in the cylinder of the extruder is 4 minutes.

Table 6 shows the mixture ratios of linear and cross-linked polyoxymethylenes as well as the size of the spherulites and the ball indentation hardness of shaped articles made from the molding compositions of the invention.

POM I

To a mixture of 1000 g of trioxane, 20 g of ethylene oxide and 30 g of p-glycidoxy-cinnamic acid methyl ester, 35 ml of a catalyst solution of 1 part by volume of BF$_3$-dibutyl-etherate in 40 parts by volume of cyclohexane are added. The mixture, in a layer thickness of 0.8 cm, is polymerized in a closed vessel in a thermoconstant path having a temperature of 70° C. The polymerization time is 30 minutes. The polymer block obtained is ground and treated for 30 minutes at 150° C. in benzyl alcohol containing 1% of triethanolamine, in order to remove the unstable terminal semi-acetal groups and the residual monomers. After cooling, the polymer is suction-filtered, boiled several times with methanol and dried at a temperature of from 50° to 70° C. under reduced pressure. The polymer yield is 670 g, the RSV value of the polymer is 0.78 dl.g$^{-1}$, and its i$_2$ value is 1.27 g/10 min.

Subsequently, the polymer so obtained is ground and subjected to radiation of a Xenon test lamp for 10 hours. After this treatment, the RSV value cannot be measured any more, since only a small portion of the polymer is still soluble in butyrolactone. The melt index i$_2$ is 0.77 g/10 min.

POM II 1.5 ml of a catalyst solution of 1 part by volume of BF$_3$-dibutyl-etherate in 10 parts by volume of cyclohexane are added to a mixture of 85 g of trioxane, 5 g of dioxolane and 10 g of p-glycidoxy-benzaldehyde. The mixture is polymerized in a closed vessel in a thermoconstant bath of 70° C. The polymer block obtained is maintained at 70° C. for a further 60 minutes, subsequently worked up in benzyl alcohol, and washed and dried as indicated for POM I. 79 g of a white powder are obtained the RSV value of which is 0.34 dl.g$^{-1}$.

The polymer is kneaded for 10 minutes with 0.5% of bis(2-hydroxy-3-tert.-butyl-5-methylphenyl)methane and 0.1% of dicyanodiamide at 195° C. in a Brabender plastograph. The product obtained is insoluble in butyrolactone, its i$_2$ value is 0.15 g/10 min.

POM III 10 g of a copolymer of 1000 g of trioxane, 20 g of ethylene oxide and 50 g of p-glycidoxy-benzaldehyde are treated at 120° C. for 30 minutes in 350 ml of benzyl alcohol with 0.3 ml of a 80% hydrazine hydrate solution. The melt index $i_2$ of the polymer of 156 g/10 min. is thus altered to 1.0 g/10 min.

POM IV 40 mg of adipic acid bishydrazide are added to 5 g of a copolymer of 1000 g of trioxane, 20 g of ethylene oxide and 50 g of p-glycidoxy-benzaldehyde, and the copolymer is additionally stabilized with 35 mg of bis(2-hydroxy-3-tert.-butyl-5-methylphenyl)methane. After a melting time of 40 minutes at 190° C., the melt index $i_2$ cannot be measured any more, while it was 156 g/10 min. before the reaction.

POM V 0.7 ml of a catalyst solution of 1 part by volume of $BF_3$-dibutyl-etherate in 40 parts by volume of cyclohexane is added to a mixture of 95 g of trioxane and 5 g of p-glycidoxynitrobenzene, and the mixture is polymerized and worked up as described for POM I, the only difference being a polymerization time of 60 minutes. The washed and dried polymer powder is dissolved, at 120°–130° C., in 2 l of benzyl alcohol to which 50 ml of a 80% aqueous hydrazine hydrate solution is added, and, after complete dissolution, a trace of Raney nickel. The reaction mixture is maintained at 120°–130° C. for 30 minutes. After cooling, the polymer is suction-filtered, boiled with methanol and dried at 50° to 70° C. under reduced pressure. The yield of amino group containing polymer is 77 g, its melt index is 15.7 g/10 min.

25 g of the polymer are melted at 190° C., as described for POM II, with 200 mg of 1,4-diazo-bicyclo[2.2.2]-octane. 300 mg of 4,4'-diisocyanato-diphenylmethane are added in small portions within 3 minutes, which causes the viscosity of the melt to increase to a considerable extent. After a further 3 minutes, the reaction is stopped. The RSV value cannot be determined any more on account of the high degree of cross-linking; the $i_2$ value is 0.5 g/10 min.

POM VI

A mixture of 9 parts of trioxane and 1 part of eipichlorohydrin is polymerized, as described for POM I, using 0.05 part of a mixture of 20 parts by volume of cyclohexane and 1 part by volume of boron trifluoride-di-n-butyl-etherate. The polymer blocked obtained is ground, and the powder is boiled in methanol for 30 minutes. After suction-filtration and drying at 50° C. under nitrogen, a polymer powder having a RSV value of 0.64 dl.g$^{-1}$ and a chlorine content of 4.1% is obtained.

1 part of this polymer is agitated for 2 hours in an autoclave at 155° C. under a nitrogen blanket with 1 part of potassium hydroxide, 17 parts of water and 33 parts of methanol. The mass remaining after cooling is ground and boiled several times with methanol. After drying at 50° C. in a nitrogen current, 0.6 part of a weakly yellowish powder are obtained, the IR spectrum of which clearly shows hydroxyl bands.

25 g of this hydroxyl group containing polymer are melted at 190° C. in a Brabender plastograph under nitrogen, together with 125 mg of bis(2-hydroxy-3-tert.-butyl-5-methyl-phenyl)methane and 25 mg of dicyanodiamide. After 200 mg of 1,4-diaza-bicyclo[2.2.2]octane are added, a total of 500 mg of 4,4'-diisocyanatodiphenylmethane are added in small portions. The melt viscosity of the mixture increases to a considerable extent in this operation. After a further 5 minutes, the whole is allowed to cool. The $i_2$ value of the product is 0.1 g/10 min; the viscosity cannot be measured, since the polymer is insoluble in butyrolactone.

POM VII 25 g of a polymer of 88 parts of trioxane, 2 parts of ethylene oxide and 10 parts of p-glycidoxy-benzaldehyde obtained as described for the preparation of POM II are melted with 125 mg of bis(2-hydroxy-3-tert.-butyl-5-methyl-phenyl)methane at 190° C. under nitrogen in a Brabender plastograph. A total of 370 mg of ethylene diamine are added in small portions within 15 minutes. After this time has passed, the melt has portions solidified, the $i_2$ value of the polymer cannot be measured any more.

POM VIII 10 g of a pulverulent copolymer of 98% of trioxane-/and 2% of dioxolane having a melt index $i_2$ of 9.0 g/10 min. are elutriated in 100 ml of cyclohexane (dried over lithium-aluminum hydride and distilled), and 1.0 ml of 1,4-butanediol-diglycidyl ether and 0.15 ml of boron trifluoride-di-n-butyl-etherate are added with agitation. The mixture is maintained at 45° C. under nitrogen for 40 minutes and, as described for POM I, worked up with benzyl alcohol, washed and dried. The $i_2$ value of the polymer cannot be measured any more.

Table 6

| Example | linear POM (% by weight) | branched or crosslinked POM (% by weight) | Size of spherulites (microns) | Ball indentation hardness (kp/cm$^2$) |
|---|---|---|---|---|
| f | 100 | — | 550 | 1545 |
| 29 | 99 | 1 POM I | 15 | 1635 |
| 30 | 99 | 1 POM II | 7 | 1615 |
| 31 | 97 | 3 POM II | 6 | 1645 |
| 32 | 99 | 1 POM III | 10 | 1610 |
| 33 | 99 | 1 POM IV | 12 | 1615 |
| 34 | 99 | 1 POM V | 25 | 1600 |
| 35 | 99 | 1 POM VI | 10 | 1615 |
| 36 | 99.95 | 0.05 POM VII | 30 | 1600 |
| 37 | 99 | 1 POM VII | 25 | 1605 |
| 38 | 97 | 3 POM VIII | 16 | 1610 |

EXAMPLE 39

A linear homopolymer of formaldehyde with terminal acetate groups, having a density of 1.43 g.ml$^{-1}$, a RSV value of 0.70 dl.g$^{-1}$ and a crystallite melting point of 174° C. is mixed with the stabilizers indicated in Examples 1 to 6 in the amounts also indicated there, and 2% of POM IV used in Example 35, and homogenized and granulated as described in Examples 29 to 38. To size of spherulites and the ball indentation hardness of shaped articles obtained from the molding composition of the invention, as compared with an unmodified homopolymer, are listed in Table 7.

Table 7

| Example | linear POM (% by weight) | branched or cross-linked POM (% by weight) | Size of spherulites (microns) | Ball indentation hardness (kp/cm$^2$) |
|---|---|---|---|---|
| g | 100 | — | 482 | 1740 |
| 39 | 98 | 2 POM IV | 27 | 1790 |

EXAMPLES 40 and 41

A linear copolymer of 98% of trioxane/and 2% of ethylene oxide having a density of 1.41 g.ml$^{-1}$, a crystallite melting point of 166° C. and a RSV value of 0.73 dl.g$^{-1}$ is mixed with the stabilizers indicated in Examples 1 to 6 in the amounts also indicated there, and with 1% each of POM IX and POM X as hereinafter described, and homogenized and granulated as described in Examples 29 to 38. The size of spherulites of shaped articles obtained from the molding compositions of the invention are listed in Table 8.

POM IX 100 g of a mixture of 96.75 parts of trioxane, 2 parts of dioxolane and 1.25 parts of a polyether of tetrahydrofuran, ethylene oxide and 2.9-dioxa-dispiro[3.2.3.2]duodecane in a weight ratio of 50:50:0.05 are combined with a catalyst solution of 1 part by volume of boron trifluoride-dibutyl-etherate and 20 parts by volume of cyclohexane and polymerized at 70° C. for 30 minutes.

The cited polyether is prepared by polymerization at 20° C. in aluminum tubes of each 100 g of monomer mixture using 150 mg of triphenyl-methyl-hexafluorophosphate as catalyst. The polymerization time is 24 hours, work-up is carried out by steam distillation.

The polyoxymethylene obtained is cooled to 0° C. and ground at once to obtain a fine powder. The powder, at a concentration of 50 g of polymer per 1000 ml of a solution of methanol:water:triethylamine in a ratio (parts by volume) of 66:34:0.1, is degraded for 30 minutes in an autoclave under nitrogen at a temperature of 150° C. Subsequently, it is thoroughly washed with acetone and dried at 70° C. in a nitrogen current. The product obtained has a melt index of from 2.8 g/10 min.

POM X

The preparation is carried out as for POM IX, but as polyether a terpolymer of tetrahydrofuran, ethylene oxide and 1,4-butanediol-diglycidyl ether in a weight ration of 50:50:0.5 is used. The block copolymer obtained has a melt index i$_2$ of 4.1 g/10 min.

Table 8

| Example | linear POM (% by weight) | branched or cross-linked POM (% by weight) | Size of spherulites (microns) |
|---|---|---|---|
| h | 100 | — | 493 |
| 40 | 99 | 1 POM IX | 20 |
| 41 | 99 | 1 POM X | 25 |

Comparative Examples (A)(a) According to Example 2 of U.S. Patent 3,519,696 a mixture of 98 grams of trioxane, 3 grams of 1,3-dioxoline and 150 ppm boron trifluoride di-n-butyl etherate (diluted with 40 parts by volume of cyclohexane) was put into a bag made of a terpolymer of trioxane, ehtylene oxide and 1,4-butane diol diglycidyl ether (weight ratio 97.8:2.0:0.2), having a wall thickness of 50 microns. The closed bag was hung for 30 minutes in a water bath having a temperature of 70° C. Then the raw copolymer and 0.05% by weight of the bag material, calculated on the raw copolymer, was crushed and pulverized in a cross-beater up to a particle diameter of 100 microns and then dissolved in 1 liter of benzyl alcohol containing 10 milliliters of triethanol amine at a temperature of 150° C. After 30 minutes the solution was allowed to cool, the precipitated copolymer was filtered with suction, boiled with methanol and dried in vacuo.

The yield was 48.0% by weight; the reduced specific viscosity was 0.67 deciliter per gram (measured with a solution of 0.5 gram of the copolymer in 100 milliliters of $\epsilon$-butyrolactone containing 2% by weight of diphenyl amine at a temperature of 140° C.).

The product obtained was mixed with 0.5% by weight of bis(2-hydroxy-3-tert.butyl-5-methyl-phenyl)-methane and 0.1% by weight of dicyanodiamide as stabilizers and homogenized in an one-screw-extruder at a temperature of 200° C. Samples of the homogenized mixture were melted at a temperature of 180° C. between two glass plates and subsequently crystallized at a temperature of ;b 150° C. under atmospheric pressure, and the resulting films having a thickness of about 10 microns were examined under the microscope. The size of the spherulites was 210 microns in diameter.

(b) Experiment(a) was repeated under equal conditions except that there was used a bag made of a terpolymer of trioxane, ethylene oxide and 1,4-butane diol diglycidyl ether in a weight ratio of 97.95:2.0:0.05, and that 1.0% by weight of the bag material was added to the raw copolymer.

The yield was 45.5% by weight; the reduced specific viscosity (measured according to (a)) was 0.72 deciliter per gram.

After mixing the product with the stabilizers according to (a) the resulting mixture was homogenized, and the size of spherulites was examined according to (a); it was found to be 205 microns in diameter.

(B)(a) Experiment (Aa) was repeated while using a bag made of polyethylene. After termination of the polymerization the bag was removed, and then the raw copolymer was worked up according to Aa).

The yield was 76.0% by weight; the reduced specific viscosity (measured according to (Aa)) was 0.63 deciliters per gram.

After mixing the product with the stabilizers according to Aa) the resulting mixture was homogenized, and the size of spherulities was examined according to (Aa); it was found to be 290 microns in diameter.

(b) Experiment (Ab) was repeated while using a bag made of polyethylene. After termination of the polymerization the bag was removed, and then the raw copolymer was worked up according to Aa).

The yield was 77.2% by weight; the reduced specific viscosity (measured according to (Aa)) was 0.57 deciliters per gram.

After mixing the product with the stabilizers according to (Aa) the resulting mixture was homogenized, and the size of spherulites was examined according to (Aa); it was found to be 272 microns in diameter.

(C)(a) Experiment (Ba) was repeated the bag being removed before working up the raw copolymer according to (Aa).

The yield was 78.5% by weight; the reduced specific viscosity (measured according to (Aa)) was 0.60 deciliters per gram.

After mixing the copolymer with the stabilizers according to (Aa) and additionally with 0.05% by weight of the bag material of (Aa), the resulting mixture was homogenized, and the size of spherulites was examined according to (Aa); it was found to be 40 microns in diameter.

(b) Experiment Bb) was repeated the bag being removed before working up the raw copolymer according to (Aa).

The yield was 76.8% by weight; the reduced specific viscosity (measured according to (Aa)) was 0.61 deciliters per gram.

After mixing the copolymer with the stabilizers according to (Aa) and additionally with 0.05% by weight of the bag material of (Ab), the resulting mixture was homogenized, and the size of spherulites was examined according to (Aa); it was found to be 12 microns in diameter.

We claim:

1. A thermoplastic molding composition consisting essentially of a mixture of
    (A) from 99.9 to 90% by weight of a prestabilized linear polyoxymethylene being
        (a) a homopolymer of formaldehyde or of trioxane, the terminal hydroxyl groups of which homopolymer being stabilized against degradation by chemical reaction, or
        (b) a copolymer of trioxane and a monofunctionally reacting compound copolymerizable with trioxane, which copolymer has been subjected to a controlled, partial, thermal or hydrolytic degradation down to primary terminal alcohol groups, and
    (B) as a nucleating agent for (A) from 0.1 to 10% by weight of a branched or cross-linked polyoxymethylene being
        (a) a copolymer of trioxane and a multifunctionally reacting compound copolymerizable with trioxane, or
        (b) a copolymer of trioxane, a multifunctionally reacting compound copolymerizable with trioxane and a monofunctionally reacting compound copolymerizable with trioxane, and being prepared by mixing the components and subsequently homogenizing them in the melt.

2. The composition of claim 1 wherein the component (A)(b) is a copolymer of from 99.9 to 80% by weight of trioxane and from 0.1 to 20% by weight of a cyclic ether having from 3 to 5 ring members or a cyclic acetal differing from trioxane and having from 5 to 11 ring members or a linear polyacetal.

3. The composition of claim 1 wherein the component (B) is a polymer of from 99.9 to 80% by weight of trioxane, from 0 to 20% by weight of a cyclic ether having from 3 to 5 ring members or a cyclic acetal differing from trioxane and having from 5 to 11 ring members or a linear polyacetal, and from 0.01 to 5% by weight of an alkylglycidyl formal, a polyglycol-diglycidyl ether, an alkanediol-diglycidyl ether or a bis(alkanetriol)-triformal.

4. The composition of claim 1 wherein the component (B) is a branched or cross-linked polyoxymethylene having a melt index of from 0.1 to 50 grams per 10 minutes, measured according to DIN 53 735 at a temperature of 190° C. and a load of 2.16 kilograms.

5. A thermoplastic molding composition consisting essentially of a mixture of
    (A) a prestabilized linear polyoxymethylene being
        (a) a homopolymer of formaldehyde or of trioxane, the terminal hydroxyl groups of which homopolymer being stabilized against degradation by chemical reaction, or
        (b) a copolymer of trioxane and a monofunctionally reacting compound copolymerizable with trioxane, which copolymer has been subjected to a controlled, partial, thermal or hydrolytic degradation down to primary terminal alcohol groups, and
    (B) as a nucleating agent for A) a branched or cross-linked polyoxymethylene being
        (a) a copolymer of trioxane with a multifunctionally reacting compound copolymerizable with trioxane, compound (A) amounting to from 99.999 to 99.9% weight and component (B) amounting to from 0.001 to 0.1% by weight, or
        (b) a copolymer of trioxane, a multifunctionally reacting compound copolymerizable with trioxane and a monofunctionally reacting compound copolymerizable with trioxane, compound (A) amounting to from 99.999 to 99.9% by weight and component (B) amounting to from ;b 0.001 to 0.1% by weight, or
        (c) a copolymer of trioxane, a monofunctionally reacting compound copolymerizable with trioxane and a branched or cross-linked polyether, component (A) amounting to from 99.999 to 90% by weight and component (B) amounting to from 0.001 to 10% by weight, and bein prepared by mixing the components and subsequently homogenizing them in the melt.

6. The composition of claim 5 wherein the component (Ab) is a copolymer of from 99.9 to 80% by weight of trioxane and from 0.1 to 20% by weight of a cyclic ether having from 3 to 5 ring members or a cyclic acetal differing from trioxane and having from 5 to 11 ring members or a linear polyacetal.

7. The composition of claim 5 wherein the component (B) is a copolymer of trioxane with a cyclic ether having from 3 to 5 ring members or a cyclic acetal differing from trioxane and having from 5 to 11 ring members or a linear polyacetal and an alkylglycidyl formal, a polyglycol-diglycidyl ether, an alkanediol-diglycidyl ether, a bis(alkanetriol)-triformal or an oligomer formal obtained by reaction of 1 mol of a 1,2(5-11)-triol with 0 to 1 mol of an α,ω-diol having a molecular weight of from 62 to 1.000, 0 to 1 mol of a monohydric alcohol having from 1 to 11 carbon atoms and 1 mol of formaldehyde per 2 mols each of hydroxyl groups of the reaction mixture.

8. The composition of claim 5 wherein the branched or cross linked polyether of component (Bc) is a copolymer of at least one monofunctionally reacting cyclic ether having from 3 to 5 ring members and an aliphatic or cycloaliphatic compound containing two ring ether groups and from 3 to 5 ring members.

9. The composition of claim 5 wherein the component (B) is a branched or cross-linked polyoxymethylene having a melt index of from 0 to 50 grams per 10 minutes, measured according to DIN 53 735 at a temperature of 190° C. and a load of 2.16 kilograms.

10. A process for the manufacture of a thermoplastic composition containing a nucleating agent which comprises mixing
    (A) a prestabilized linear polyoxymethylene being
        (a) a homopolymer of formaldehyde or of trioxane, the terminal hydroxyl groups of which homopolymer being stabilized against degradation by chemical reaction, or
        (b) a copolymer of trioxane and monofunctionally reacting compound copolymerizable with trioxane, which copolymer has been subjected to a controlled, partial, thermal and hydrolytic degradation down to primary terminal alcohol groups, and (B) a branched or cross-linked polyoxymethylene serving as nucleating agent and being
  (a) a copolymer of trioxane and a multifunctionally reacting compound copolymerizable with trioxane, or
  (b) a copolymer of trioxane, a multifunctionally reacting compound copolymerizable with trioxane and a monofunctionally reacting compound copolymerizable with trioxane, or
  (c) a copolymer of trioxane, a monofunctionally reacting compound copolymerizable with trioxane and a branched or cross-linked polyether.
and subsequently homogenizing the components in the melt.

11. The process of claim 10 wherein the component (A) is used in an amount of from 99.9 to 90% by weight and the component (Ba) or (Bb) in an amount of from 0.1 to 10% by weight.

12. The process of claim 10 wherein the component (A) is used in an amount of from 99.999 to 99.9% by weight and the component (Ba) or (Bb) in an amount of from 0.001 to 0.1% by weight.

13. The process of claim 10 wherein the component (A) is used in an amount of from 99.999 to 90% by weight and the component (Bc) in an amount of from 0.001 to 10% by weight.

14. A shaped article manufactured from the composition of claim 1.

15. A shaped article manufactured from the composition of claim 5.

16. In a process of preparing a thermoplastic molding composition based on a linear polyoxymethylene containing a nucleating agent by mixing and homogenizing the components the improvement comprising nucleating said linear polyoxymethylene with a copolymer of
  (A) from 99.99 to 70% by weight of trioxane and
  (B) from 0.01 to 30% by weight of a copolymer of
  (1) a mono-functionally reacting cyclic ether of the formula

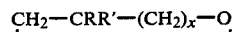

wherein R and R' are the same or different, each representing a hydrogen atom, an aliphatic alkyl radical having from 1 to 6 carbon atoms, which radical may contain from 1 to 3 halogen atoms, or a phenyl radical, and x is zero, 1 or 2, and
  (2) a bifunctionally reacting cyclic ether selected from the group consisting of
    (a) a diglycidyl ether of an $\alpha,\omega$-diol having from 2 to 8 carbon atoms,
    (b) a diglycidyl ether of a bisphenol,
    (c) an aliphatic or cylco-aliphatic hydrocarbon doubly substituted by an oxacyclobutyl radical and having from 1 to 6 carbon atoms, and
    (d) 2,9-dioxa-dispiro [3.2.3.2] duodecane.

17. The composition as defined in claim 1 wherein the crystalline spherulite size of the thermoplastic molding composition is from 6 microns to 65 microns.

* * * * *